April 30, 1957  H. W. BATCHELLER  2,790,963
BRANCH CONNECTOR FOR A WIRE
Filed May 16, 1955

Inventor
Hugh W. Batcheller
by Wright, Brown,
Quinby May Attys.

United States Patent Office 2,790,963
Patented Apr. 30, 1957

2,790,963

BRANCH CONNECTOR FOR A WIRE

Hugh W. Batcheller, Newton Highlands, Mass., assignor to Kent Mfg. Corp., Newton, Mass., a corporation of Massachusetts Application May 16, 1955, Serial No. 508,528

5 Claims. (Cl. 339—276)

This invention relates to a connector a part of which is adapted to be permanently attached to the end of a branch wire. The connector is constructed to embrace a main wire at any point thereof to make a good electrical connection therewith which can readily be disconnected. It is an object of the invention to provide a connector which can be made easily and cheaply and which will make it easy to connect branch wires to a main wire at intermediate points so as to lead off at right angles thereto. Certain preferred embodiments of the invention are illustrated on the drawing, of which—

Figure 1:
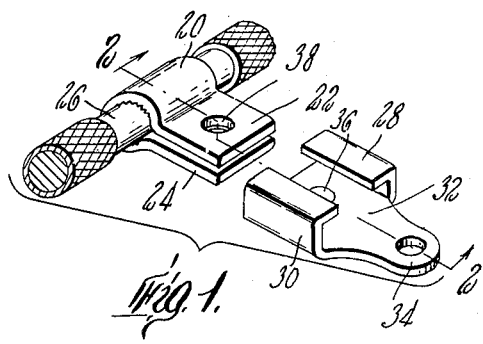
Figure 1 is an exploded perspective view of an embodiment of the invention.
Figure 2:
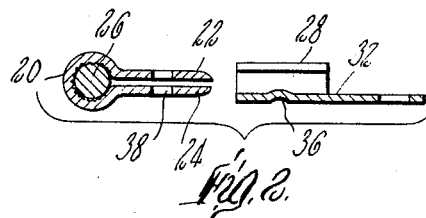
Figure 2 is a section on the line 2—2 of Figure 1.
Figure 3:
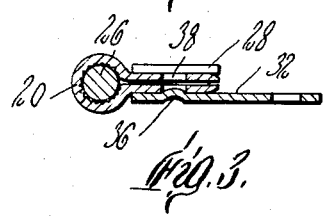
Figure 3 is a section similar to Figure 2, but showing the parts joined.

The branch connector shown in Figures 1, 2 and 3 consists of two members, one of which is a split tubular member 20 of stiff sheet metal which can be bent and has some degree of resilience. Projecting from the edges of the split are plane extensions 22 and 24 which are substantially parallel when the split is closed. The tubular portion is shaped and adapted to embrace and grip a wire or rod 26 of predetermined diameter when the split is substantially closed. To make a better electrical connection between the wire 26 and the tubular member 20, the interior surface of the latter is preferably serrated so that the sharp ridges or teeth will dig into the surface of the wire 26 when it is embraced by the tubular member 20. To hold the extensions of the tubular member in substantially parallel relation, a pair of clips 28 and 30 are provided to engage over the side margins of the extensions. The clips are integral with a connecting web 32 which is slightly under the extensions 22 and 24 so that the latter can be received between the clips. A portion 34 of the connecting web 32 serves as a terminal for a branch wire (not shown) which can be soldered, welded or otherwise secured to the terminal.

To connect a branch wire to the wire 26, the split of the tubular member 20 is opened out sufficiently to receive the wire 26 whereupon the extensions 22 and 24 are moved to each other and thrust between the clips 28 and 30 which hold the tubular member 20 in gripping relation on the wire 26. Withdrawal of the extensions from between the clips is resisted by a small boss 36 rising from the middle of the connecting web 32 to enter a recess or hole 38 in one of the extensions.

Figure 4:
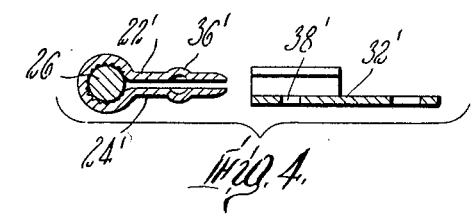
Figure 4 is a sectional view of the parts of a slightly modified form of the invention.
Figure 5:
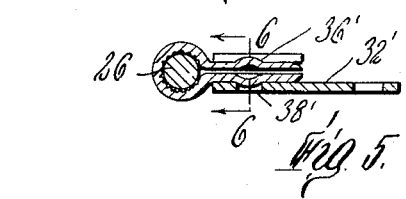
Figure 5 is a section similar to Figure 4, but showing the parts joined.
Figure 6:
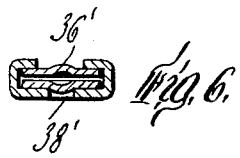
Figure 6 is a section on the line 6—6 of Figure 5.
Figure 7:
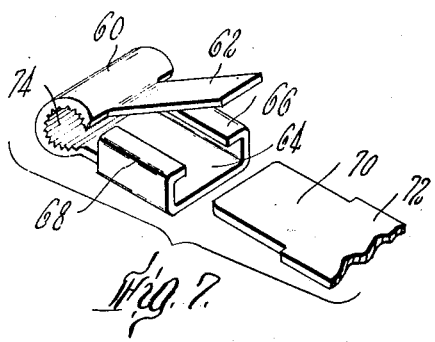
Figure 7 is an exploded perspective view of another modified form of the invention.
Figure 8:
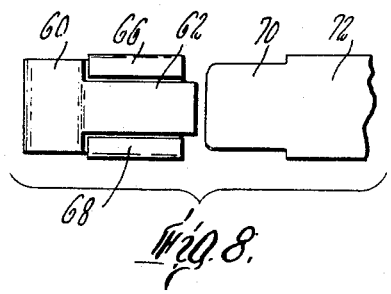
Figure 8 is a plan view of the parts shown in Figure 7.
Figure 9:
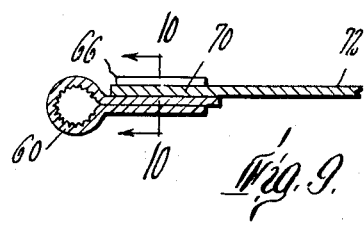
Figure 9 is a longitudinal section of the connector shown in Figures 7 and 8, the parts being joined.
Figure 10:
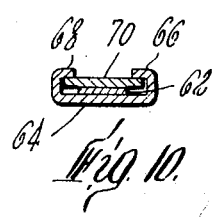
Figure 10 is a section on the line 10—10 of Figure 9.

If preferred, a boss 36' can be provided in each of the extensions 22' and 24' to engage in a recess or hole 38' in the connecting web 32' of the clip member, as shown in Figures 4, 5 and 6.

A modified form of the invention is shown in Figures 7 to 10. A split tubular member 60 has extensions 62 and 64 projecting from the edges of the split. The extensions are of different widths, the wider extension 64 having wings 66 and 68 which are bent upward and then inward to form overhanging flanges adapted to act as clips with the extension 64. The narrower extension 62 is slightly narrower than the distance between the flanges 66 and 68 so that it can be moved down between the flanges into substantial parallelism with the extension 64. To lock the extension 62 in such position, a tongue 70 is provided, the width of the tongue being slightly less than that of the extension 64 so that it can enter between the wings of the extension and engage under both flanges 66 and 68. The tongue 70 thus overlies the extension 62 after the latter has been moved to close the split and holds it in the position indicated in Figures 9 and 10. The tongue is preferably a part of a terminal 72 adapted for attachment to a branch wire (not shown). The interior surface of the tubular member 60 is preferably serrated as at 74 to make a better electrical connection when the member embraces a wire.

I claim:

1. A branch electrical connector comprising a split tubular member adapted to embrace a cylindrical wire or rod, plane extensions integral with said member projecting from the edges of the split and in substantially parallel planes when said split is closed, clips adapted to engage and hold the side margins of said extensions when substantially parallel, and means for electrically connecting said clips to a branch wire.

2. A branch electrical connector comprising one member consisting of a split tubular metal having plane extensions integral with said member projecting from the edges of the split and substantially parallel when the split is closed, and a second metal member comprising a pair of clips adapted to engage on the side margins of said extensions when said extensions are substantially parallel and a connecting web integral with said clips and having a portion for attachment to a branch wire.

3. A connector as in claim 2, the interior surface of said tubular member being serrated.

4. A connector as in claim 2, said extensions of the first said member and said connecting web of the second said member having interengaging elements yieldably resisting separation of said members.

5. A branch electrical connector comprising a split tubular metal member having plane extensions integral therewith projecting from the edges of the split and substantially parallel when the split is closed, one of said extensions being wider than the other and having side elements bent upward and then inward to form opposed overhanging flanges, the narrower of said extensions being slightly narrower than the distance between said opposing flanges, and a terminal member for a branch wire having a tongue portion adapted to engage under both said flanges and overlie said narrower extension when the two extensions are substantially parallel.

References Cited in the file of this patent

UNITED STATES PATENTS

| | | |
|---|---|---|
| 908,389 | Briggs | Dec. 29, 1908 |
| 1,705,579 | Lutz | Mar. 19, 1929 |
| 2,600,188 | Batcheller | Jan. 10, 1952 |